H. GARABEDIAN.
EXPANSIBLE BRACELET OR CHAIN.
APPLICATION FILED APR. 13, 1916.

1,209,830.

Patented Dec. 26, 1916.

Inventor
Harry Garabedian
By Shepherd & Campbell
Attorneys

UNITED STATES PATENT OFFICE.

HARRY GARABEDIAN, OF PROVIDENCE, RHODE ISLAND, ASSIGNOR TO REX MANUFACTURING COMPANY, A CORPORATION OF RHODE ISLAND.

EXPANSIBLE BRACELET OR CHAIN.

1,209,830.　　　　　Specification of Letters Patent.　　Patented Dec. 26, 1916.

Application filed April 13, 1916.　Serial No. 90,964.

*To all whom it may concern:*

Be it known that I, HARRY GARABEDIAN, a subject of the Sultan of Turkey, residing at Providence, in the county of Providence and State of Rhode Island, have invented certain new and useful Improvements in Expansible Bracelets or Chains, of which the following is a specification.

This invention relates to expansible bracelets or chains and it has for its object the provision of an improved device of this nature in which the links are so constructed that one or more of said links may be readily disconnected from the others when desired, or one of said links may be disconnected from an adjacent link when it is desirable to do so for any purpose.

I am aware of the fact that chains of this nature are known in which the several links each comprise a pair of members longitudinally slidable with relation to each other and containing springs bearing between said members, but as the present description proceeds it will be seen that it contemplates the provision of a very novel structure for permitting the ready disconnection of one link from an adjacent link while maintaining the two members of each link and their associated springs in complete assembled relation.

Further objects and advantages of the invention will be set forth in the detailed description which now follows.

Figure 1:
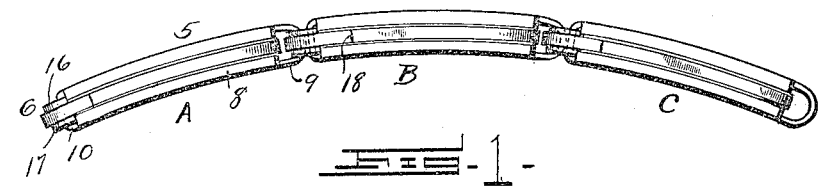
Figure 2:
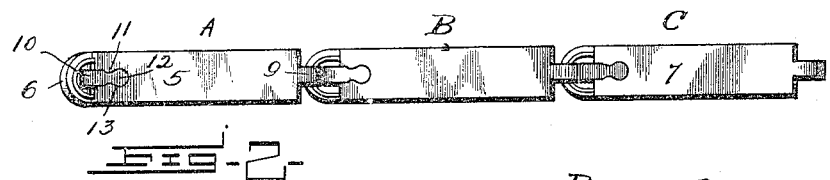
Figure 3:
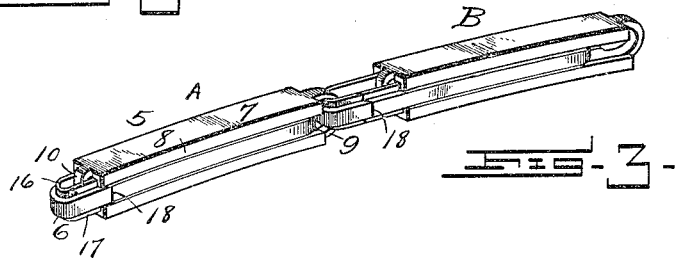
Figure 4:
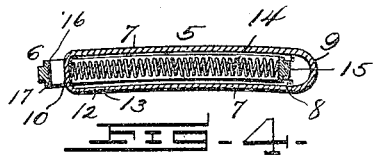
Figure 7:
Figure 5:
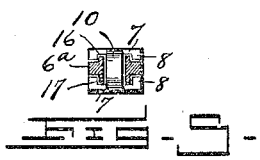
Figure 6:
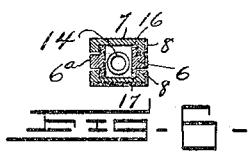

In the accompanying drawing Figure 1 is an edge view of a plurality of associated links constructed in accordance with the invention; Fig. 2 is an inside face view of said links; Fig. 3 is a perspective view illustrating two of said links and with the link loop of one of said links partially withdrawn from its sheath; Fig. 4 is a longitudinal sectional view through one of said links; Fig. 5 is a cross sectional view through one of the link loops on a line outside of the end of the sheath; Fig. 6 is a like view taken across the loop and sheath; and Fig. 7 is a detail view in plan of the outer end of one of the link loops.

Like numerals designate corresponding parts in all of the figures of the drawing.

Referring to the drawing, it will be seen that the expansible bracelet or chain is made up of a plurality of links designated as a whole by the letters A, B and C. Each link comprises a sheathing 5 and a loop 6 slidably disposed within the sheathing. Each sheathing comprises side walls 7 having at their opposite edges, inturned flanges 8. At one end the walls 7 are permanently tied together by bows 9, while at their opposite ends they are separably united by bowed tongues 10. The inturned ends of these tongues are first reduced as at 11 and then enlarged at 12 and these terminal ends fit into correspondingly shaped openings 13 formed in the inner walls of the sheaths 5. This feature has already been patented under Patent No. 1,176,140 issued on the 21st day of March, 1916.

Springs 14 bear between the ends 15 of the loop 6 and the tongues 10 (see Fig. 4) and normally tend to move the loops 6 into their respective sheaths. A principal feature of the invention resides in providing the loops 6 with ribs 16 and 17 which lie inside of and bear against the flanges 8 of the sheaths 5. The loops 6 are cut or split upon a bevel at 18 (see Fig. 7) so that when the chain is pulled upon to draw one of the loops 6 to the limit of its movement out of its sheath, the loop adjacent said split portion may be sprung open far enough for the bow 9 of the adjacent link to be disengaged from said loop and it is to be noted that this action takes place without in any way interfering with the assembled relation between said loop, its sheath and its actuating spring. Normally, however, the spring retracts the loop to such an extent that the split portion 18 thereof is moved back into the sheath. At this time the flanges 8 lie outside of the ribs 16 and 17 and the tongues 10 lie inside of said ribs, whereby any movement of those portions on the opposite side walls of the loops which lie outwardly of the split portions 18, is effectually prevented and all of the elements are held in proper assembled relation with each other under all conditions and accidental disengagement of the parts is guarded against.

It is to be noted that the provision of the interengaging ribs 16 and 17 and the flanges 8 properly guides the link loops in their sheathings while leaving the outer faces 6ᵃ of the link loops flush with the outer faces of the sheath, by virtue of which a pleasing and ornamental result is secured.

It is to be understood that the invention is not limited to the precise construction set forth, because it is apparent that in the wide field of mechanics other specific arrangements of parts may be resorted to while retaining the advantageous features of the broad idea of splitting the link loops. The invention therefore, contemplates the inclusion of such modifications as fairly come within the spirit of the appended claims.

Having described my invention, what I claim is:

1. A link comprising a sheathing and a link loop slidable into and out of said sheathing, one side of said link loop being split at such a point that when the link loop is retracted into its sheathing said split portion lies within said sheathing.

2. A link comprising a sheathing consisting of opposed side plates having inturned flanges at their outer edges and link loops having oppositely extending ribs which engage behind said flanges, the outer faces of said link loops being substantially flush with the outer faces of the flanges.

3. A link comprising a sheathing consisting of opposed side plates having inturned flanges at their outer edges and link loops having oppositely extending ribs which engage behind said flanges, the outer faces of said link loops being substantially flush with the outer faces of the flanges, said link loops being split at one side.

4. A link comprising a sheathing consisting of opposed side plates having inturned flanges at their outer edges and link loops having oppositely extending ribs which engage behind said flanges, the outer faces of said link loops being substantially flush with the outer faces of the flanges, said link loops being split upon a bevel at one side.

5. A link comprising a sheathing consisting of opposed side plates having inturned flanges at their outer edges and link loops having oppositely extending ribs which engage behind said flanges, the outer faces of said link loops being substantially flush with the outer faces of the flanges, said link loops being each split at one side at such a point that the split portion normally lies within said sheathing.

6. A link comprising a link loop and a sheathing in which said link loop is slidably mounted, said link loop being split at one side and nearer one end than the other and said sheathing comprising a tie member which extends from one of its sides to the other through said link loop, said sheathing having inturned flanges at its opposite edges and said link loop having ribs at its upper and lower sides which engage said flanges.

In testimony whereof I affix my signature.

HARRY GARABEDIAN.

Copies of this patent may be obtained for five cents each, by addressing the "Commissioner of Patents, Washington, D. C."